Figure 1:
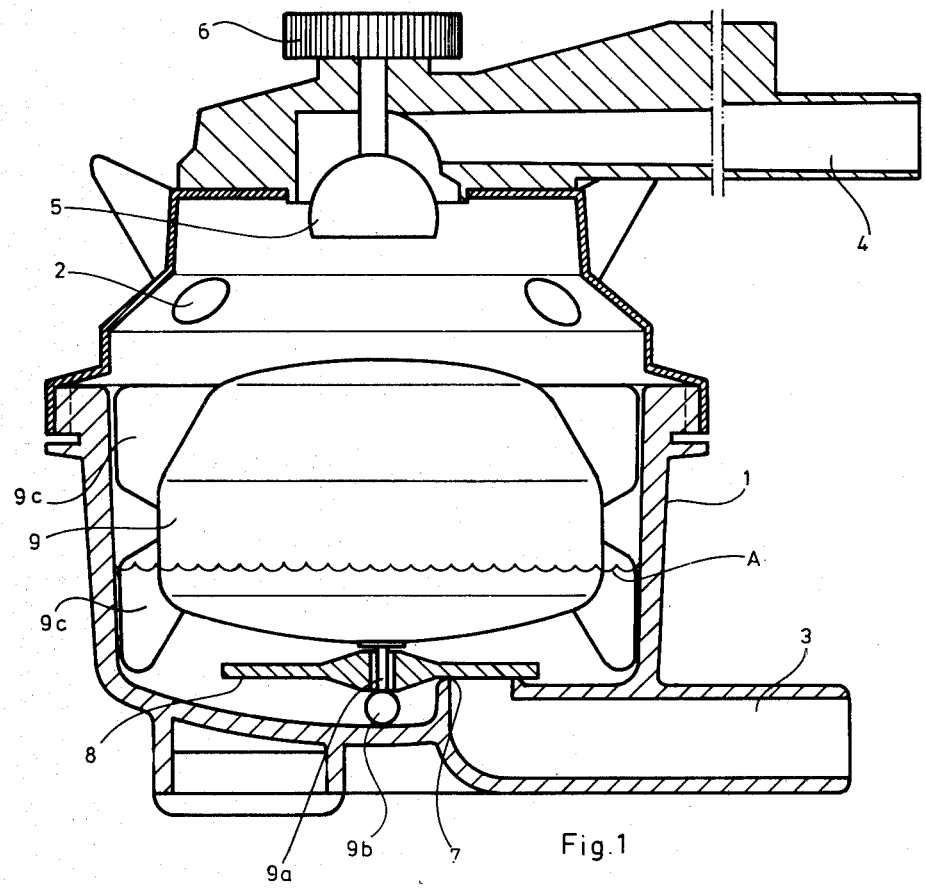

United States Patent [19]
Nordenskjold

[11] 4,314,526
[45] Feb. 9, 1982

[54] MILK RECEPTACLE WITH DISCHARGE VALVE

[75] Inventor: Kjell Nordenskjold, Lidingo, Sweden

[73] Assignee: Alfa-Laval AB, Tumba, Sweden

[21] Appl. No.: 197,816

[22] Filed: Oct. 17, 1980

[30] Foreign Application Priority Data

Oct. 31, 1979 [SE] Sweden .............................. 7909007

[51] Int. Cl.³ .................................................. A01J 9/06
[52] U.S. Cl. .................................................. 119/14.55
[58] Field of Search ............... 119/14.55, 14.54, 14.17, 119/14.08, 14.05; 137/192, 448, 397, 399

[56] References Cited

U.S. PATENT DOCUMENTS

| | | | |
|---|---|---|---|
| 2,489,461 | 11/1949 | Parrish | 137/192 |
| 2,718,208 | 9/1955 | Tanner | 119/14.08 |
| 2,920,641 | 1/1960 | Girolo | 119/14.46 X |
| 3,538,768 | 11/1970 | Duncan | 119/14.17 |
| 4,185,586 | 1/1980 | Flocchini | 119/14.08 |

*Primary Examiner*—Hugh R. Chamblee
*Attorney, Agent, or Firm*—Cyrus S. Hapgood

[57] ABSTRACT

A milk receptacle is provided at the top with an air outlet and at the bottom with a milk outlet controlled by a float-actuated valve comprising an annular disc engageable with an eccentrically disposed valve seat. The disc is connected at its center to the float and is tiltable in a vertical plane against the valve seat as the float rises, thus ensuring gradual opening of the valve by a small opening force.

3 Claims, 4 Drawing Figures

MILK RECEPTACLE WITH DISCHARGE VALVE

The present invention relates to a milk receptacle having a valve for controlling the discharge from the receptacle, particularly a teat cup claw, in a milking system, the valve comprising a valve seat at the bottom of the receptacle, a valve means cooperating with said valve seat, and a float for actuating said valve means.

The milk obtained during milking contains a relatively large amount of air in the form of foam or bubbles. With regard to the quality and durability of the milk, it is desirable to separate the air from the milk as soon as possible after milking. To this end, it is known to let the milk pass through the outlet, and separated air is evacuated via an air outlet at the top portion of the receptacle. Such a device is disclosed in U.S. Pat. No. 3,943,888 granted Mar. 16, 1976.

A drawback of this known float-actuated valve is that it requires a relatively great opening force to overcome the pressure difference between the interior of the receptacle and the outlet line, said pressure difference being required for the milk transport. A float having a relatively large volume must therefore be used to provide sufficient lifting force. The device is therefore too bulky to be suitable for use in a limited space, such as a teat cup claw.

The principal object of the present invention is to provide a valve which requires a relatively small opening force and which can therefore be actuated by a float having small dimensions. This object has been achieved by means of a valve of the above-mentioned kind which is characterized in that the valve seat is disposed eccentrically relative to the valve means comprising an annular disc connected at its center to the float and being tiltable in a vertical plane to ensure successive opening of the valve by a small opening force.

Figure 1A:
Figure 2:
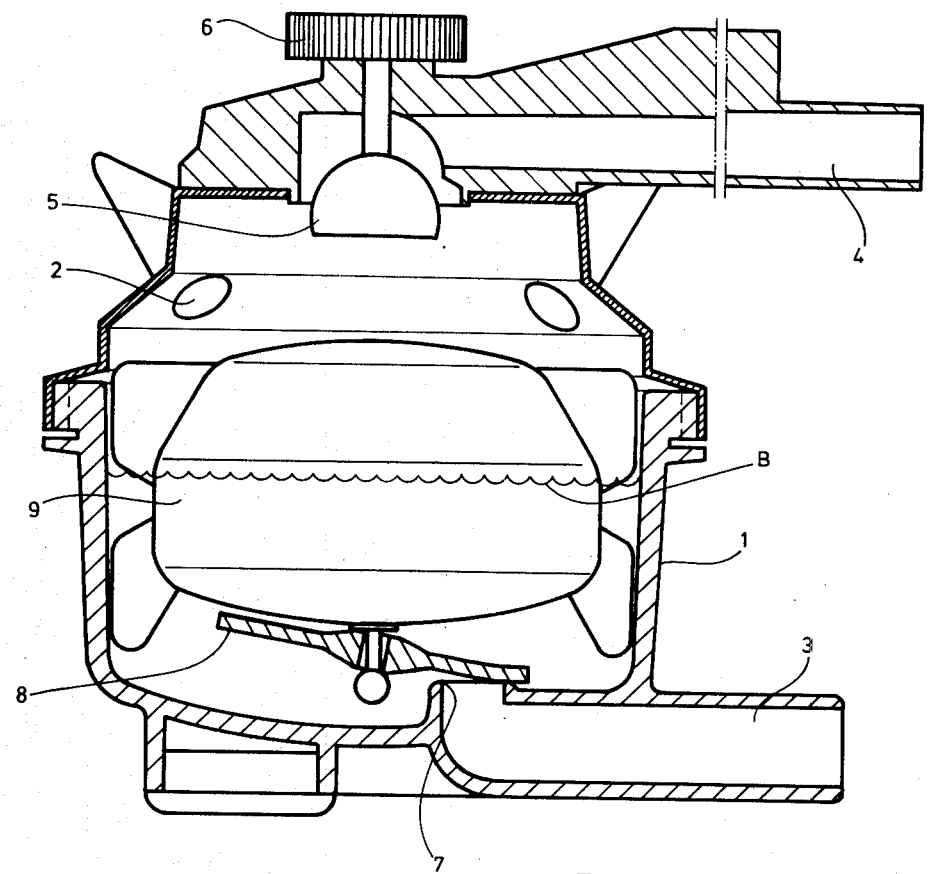
Figure 3:
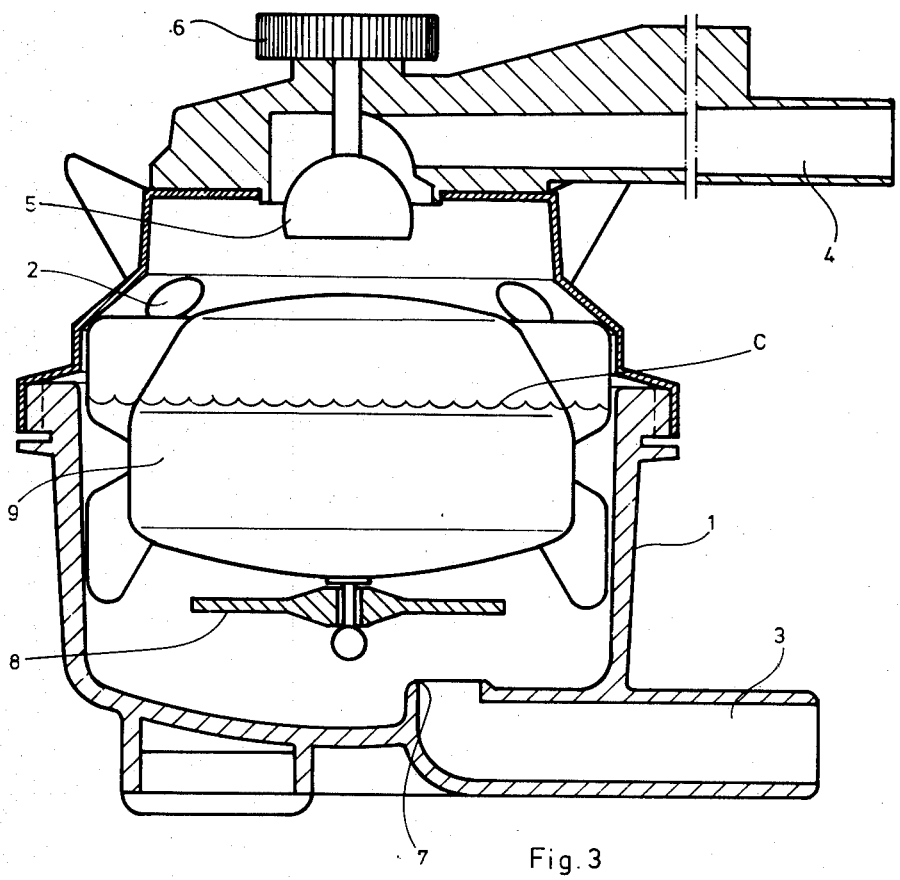

The invention will be described in more detail below with reference to the accompanying drawings, in which FIG. 1 is a vertical sectional view of a teat cup claw provided with a valve device according to the invention;

FIG. 1a is a plane view showing the configuration of the milk outlet of the claw; and FIGS. 2 and 3 are views corresponding to FIG. 1 illustrating the valve in other positions.

The teat cup claw as illustrated comprises a housing 1 having inlets 2 connected to teat cups (not shown), a milk outlet 3 connected to a milk line under vacuum, and an air outlet 4 connected to a vacuum line. These lines are not shown on the drawings. The air outlet 4 is controlled by a valve 5 which is manually actuatable by means of a knob 6 and adapted to close outlet 4 automatically in case of a large amount of air flowing into the claw.

The milk outlet 3 is provided with a horizontal valve seat 7 having a trough flow area similar to a triangle, a point of which faces the center of the housing as shown in FIG. 1a. An annular valve disc 8 of flexible material cooperates with the valve seat 7. The valve disc 8 is connected to a float 9 which is vertically movable in the housing 1 and has a shaft 9a extending downwards with a suitable clearance through a central opening in valve disc 8, shaft 9a having a protuberance 9b engaging the underside of disc 8. The float is also provided with lateral guide flanges 9c cooperating with the inner wall of the housing to prevent the float from inclining. The float as well as the valve disc are freely rotatable.

When there is no milk flow and the claw is empty or has a low milk level, as at A in FIG. 1, the float 9 is in its lower position and the valve disc 8 seals against the seat 7. The milk outlet is thus closed and the valve disc is pressed against the seat because there is a greater subatmosphereic pressure in the outlet 3 than in the interior of the claw. When the milk level rises due to milk entering through the inlets 2 (e.g., to the level B in FIG. 2), the float moves upwards and actuates the valve disc 8 so that it takes an inclined position shown in FIG. 2. In this position, the valve is partly open, the lifting force being applied at a distance from the valve seat 7. The valve disc will thus operate as a lever whereby the lifting force required for opening the valve is reduced considerably. Since the valve disc is made of a flexible material, the opening force is further reduced. The shape of the outlet area shown in FIG. 1a, which is similar to a triangle, also contributes to reducing the opening force. This is because the distance from the center of gravity of said area to the central point of the disc 8 is relatively long and also because the initially uncovered valve area (i.e., the point of the triangle) is small.

When the milk flow increases so as to raise the milk level to the position C in FIG. 3, the float rises to an upper position where the valve disc 8 is removed entirely from the seat 7, whereby the entire valve area is uncovered.

In addition to the small opening force, the new valve also ensures an even, gradual opening of the valve, which is important when the flow is small.

I claim:

1. In combination with a milk receptacle, a valve for controlling the discharge of milk from the receptacle, said valve comprising a valve seat located at the bottom of the receptacle and having a generally horizontal sealing surface, valve means cooperating with the valve seat and including a circular disc having a central portion, the disc also having a part offset horizontally from said central portion and engageable with said sealing surface, a float for actuating said valve means, and means connecting the float to said central portion of the disc and so positioning the valve means that the valve seat is disposed eccentrically relative to the disc, said connecting means allowing tilting of the disc in a vertical plane to ensure gradual opening of the valve by a small opening force, said valve seat being generally triangular and having one of its points facing said central portion of the disc.

2. The combination of claim 1, in which said disc is annular, said connecting means including a shaft extending loosely through said central portion of the disc and having at its lower end a protuberance on which the disc rests, the disc being rotatable on said protuberance in a horizontal plane and being tiltable relative to said shaft in a vertical plane.

3. The combination of claim 1, in which said offset part of the disc is engageable with the entire said sealing surface of the valve seat, said connecting means being offset horizontally from said seat in the direction of said one point thereof.

* * * * *